Dec. 17, 1957  J. B. WINTHER  2,817,028
CONTROL CIRCUIT FOR A MAGNETIC CLUTCH
Filed April 1, 1955

INVENTOR.
JERROLD B. WINTHER
BY
ATTORNEYS

United States Patent Office 2,817,028
Patented Dec. 17, 1957

2,817,028

CONTROL CIRCUIT FOR A MAGNETIC CLUTCH

Jerrold B. Winther, Kenosha, Wis., assignor to Eaton Manufacturing Company, Cleveland, Ohio, a corporation of Ohio Application April 1, 1955, Serial No. 498,592

8 Claims. (Cl. 310—95)

This application relates to a control circuit apparatus and more particularly to an apparatus for controlling the torque transmission through a slip coupling.

Broadly the present invention comprises a control circuit for variably energizing an electromagnetic clutch coil and being responsive to the sum of a reference voltage and a signal voltage, each developed from a governor generator driven proportionally to the speed of the clutch output to effect a constant output velocity of said clutch.

In industrial and other operations, many occasions arise wherein it is desirable to provide a constant velocity rotary member. Accordingly, many circuits have been devised for accomplishing this result through the provision of a controlling signal to maintain a constant output speed of a coupling. None of the prior arrangements, however, has so employed a single electrical source as the present invention for providing both reference and control signals.

Accordingly, it is an object of the present invention to provide a control circuit for an electromagnetic clutch apparatus that overcomes deficiencies of prior control circuits.

It is another object of the present invention to provide a control circuit for an electromagnetic clutch apparatus that provides a constant reference voltage and a variable voltage control signal derived from the same voltage source.

It is another object of the present invention to provide a control circuit for an electromagnetic apparatus that develops a correcting signal proportional in magnitude to the error or deviation in speed of the controlled output member from the desired speed thereof.

It is still another object of the present invention to provide a control circuit for an electromagnetic clutch apparatus that is simple and economical of design and construction and effective in performing the desired purposes.

It is still another object of the present invention to provide a control circuit for an electromagnetic clutch apparatus that is automatically operative after initial manual adjustment to maintain constant the angular velocity of the clutch output.

Still other objects and advantages of the present invention will occur from a perusal of the following description taken in connection with the accompanying drawings in which.

In most prior electrical speed controlling devices, means are provided for developing a control signal having a reference component and a signal component. A governor generator develops the signal voltage and the reference voltage is customarily derived from a conventional power line source through rectification and filtration. For a satisfactory reference voltage in such cases, power line dips and other voltage variations must be minimized by expensive, complicated, and therefore, undesirable voltage regulating equipment.

In the present invention, a governor generator is provided for developing a signal voltage component of a control voltage, and the reference voltage also is derived from the governor generator. Notwithstanding the wide range of values of voltage produced by the governor generator, by the judicious use of relatively simple, inexpensive, passive circuit elements in addition to a voltage rectifier and filter, a constant reference voltage is derived.

In the present invention, a governor generator coupled to a shaft, the angular velocity of which it is desired to maintain constant, develops an output voltage that varies in direct proportion to its angular velocity. Parallel circuits are provided at the governor generator for providing respectively, the reference voltage and the signal voltage components of the control voltage.

In one circuit for deriving the reference voltage, a parallel connected L-R time constant circuit is connected serially with a capacitor. These elements are so sized and proportioned that alternating voltages applied to the series circuit described produce a constant voltage across the capacitor mentioned. It is understood that increases in voltage of the governor generator are necessarily accompanied by increases in frequency with the result that in the series circuit above mentioned any tendency to increase the voltage across the capacitor, due to a higher impressed governor voltage, is ineffectual due to the reduced capacitive reactance of the capacitor resulting from increased frequency and the increased impedance of the L-R circuit. The capacitor voltage is applied through a transformer to a rectifier and a suitable filter to remove the ripple from the rectified voltage. The final reference voltage appears across a potentiometer, following the filter, to be combined with the signal voltage to control an appropriate gas tube rectifier circuit which provides clutch coil energization.

In the second parallel circuit, the signal voltage is derived by a mere rectification of the voltage of the governor generator with a subsequent filtration and application to a resistor connected in series with the potentiometer above mentioned.

Figure 1:
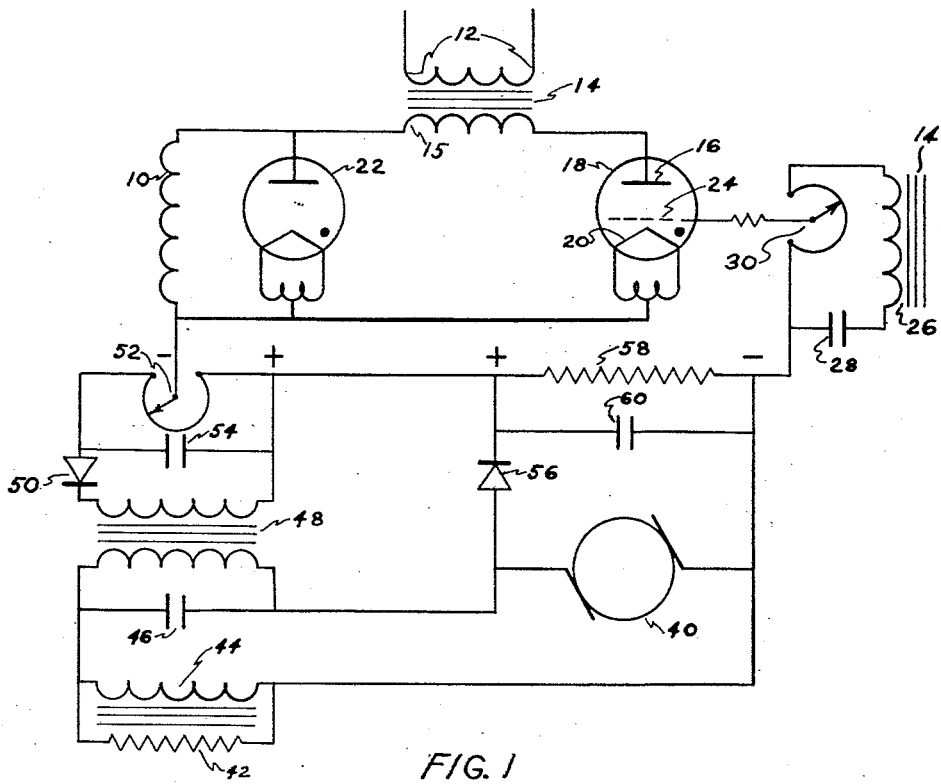
Fig. 1 illustrates a clutch control circuitry.

Referring now more particularly to Fig. 1 of the drawing for a more detailed description of the present invention, 10 represents a clutch field coil for effecting engagement of an electromagnetic clutch in accordance with the energization of the coil. Field coil 10 is energized from a power line 12 through a step-up transformer 14 which has a secondary winding 15 connected at one end to coil 10 and at the other end to a plate 16 of a grid controlled gas tube rectifier 18. The heater-cathode 20 of tube 18 is connected to the other end of coil 10 to provide a closed electrical circuit including coil 10, the secondary winding 15 of transformer 14 and tube 18. For dissipating decaying energies due to collapsing magnetic fields, in coil 10, a suitable rectifier, such as the gas filled diode rectifier tube 22 shunting coil 10 is provided. It is to be understood that any dry rectifier of the germanium or selenium type, for example, may be substituted for the tube 22. It is noted that tube 22 conducts only due to the influence of coil 10 and therefore performs no other function while the circuit is in operation.

The firing angle of gas tube 18 is controlled by the voltage applied to the grid 24. The voltage applied to grid 24 is the resultant of the control signal derived as hereinbelow explained and a rider wave derived in a circuit including another secondary winding 26 of transformer 14 connected in series with a capacitor 28 and a potentiometer 30. The magnitude of the rider wave may be adjusted by potentiometer 30 to vary the sharpness of the point of firing of tube 24.

Figure 3:
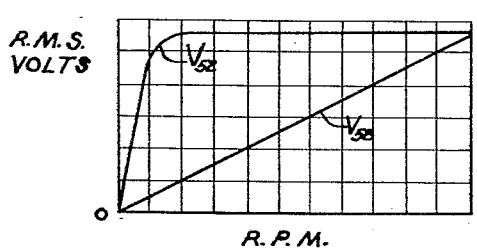
Fig. 3 is a graph employed in explaining the operation of the present invention.

An alternating current governor generator 40 having a linear output voltage versus speed characteristic as shown at $V_{58}$ in Fig. 3, is provided and has an armature (not shown) coupled to the output member of a clutch (not shown), of which coil 10 comprises the energizing coil. A first reference circuit is connected to the generator output and comprises an inductor 44 shunted by a resistor 42, in series with a capacitor 46. For compensating for the voltage drop in the circuit just mentioned the voltage of capacitor 46 is impressed upon the primary of a step-up transformer 48, the secondary of which is connected in series with a rectifier 50 and a potentiometer 52. A filtering capacitor 54 is connected across potentiometer 52 to remove the ripple wave in a well-known manner. Potentiometer 52 is adjustable for selecting the desired output speed of the clutch.

In a second signal circuit, a rectifier 56 and resistor 58 are connected in series across the output connections of generator 40 and shunted across resistor 58 is a filtering capacitor 60 for removing ripples.

The voltage appearing across potentiometer 52 is represented by the curve $V_{52}$ in Fig. 3 of the drawings and the voltage of resistor 58 is represented by the curve $V_{58}$. It is noted that voltages $V_{52}$ and $V_{58}$ are in opposition and that therefore the generator the reference voltage and the signal voltage are equal and opposite so as to give a zero value of control voltage, at top speed of the generator.

Having now fully set forth the components of the present invention, the operation will now be explained: It is assumed that a power source is driving a load through the clutch mentioned above, the output member of which is coupled to generator 40. Energization of the clutch, as explained above, is controlled by tube 18 according to the firing angle thereof. The firing angle of tube 18 is determined by the grid-cathode voltage which in the present instance is the composite voltage obtained by the combination of the reference voltage appearing across potentiometer 52, signal voltage appearing across resistor 58 and finally the rider wave voltage appearing across potentiometer 30. The resultant control voltage across potentiometer 52 and resistor 58 is a varying direct voltage and the rider wave is an alternating voltage. The composite voltage, therefore, is a direct voltage pulsating about an average value equal to the control voltage.

When the clutch output shaft is being driven at the desired speed under a steady, constant load, the combination of voltages mentioned above is such as to provide and maintain a firing angle for tube 18 that enables sufficient conduction therein to energize coil 10 and to maintain the coupling. In the event, however, that the clutch output member changes in speed due to a change in load, corrective measures automatically take place in the circuit to return the speed to the desired value. Assuming that a heavier load is imposed on the clutch output member that is normally being carried, generator 40 along with the clutch output member diminishes in speed to reduce the voltage and frequency of its output wave. As explained above, the reference voltage appearing across potentiometer 52 remains the same since capacitor 46 has applied thereacross a larger and L-R circuit 42, 44 has applied thereacross a smaller ratio of the total generator voltage by virtue of the altered impedances thereof. This compensation resulting from a frequency change concomitant with speed and voltage change is in the same amount that the voltage of generator 40 decreases due to reduced speed. The voltage response of capacitor 46 is similar to the curve $V_{52}$ shown in Fig. 3. The signal voltage, however, is decreased so as to produce a decreased output voltage across resistor 58, the effect of which when combined with the reference voltage of potentiometer 52 is to increase the control voltage between heater-cathode 20 and grid 24. The increased control voltage raises the average value of the pulsating grid voltage to alter and increase the excitation of coil 10, with the consequent increased clutch coupling to return the speed of the clutch output to desired speed, all in a manner well known.

Conversely in the event of a decreased load on the clutch output, the governor generator is driven faster to increase the voltage across resistor 58 to reduce the control voltage on tube 18 since the reference voltage across potentiometer 52 remains the same. Consequently, the firing angle of tube 18 is decreased, the current of coil 10 decreased and the clutch coupling decreased to reduce the speed of the clutch output to desired value.

It is noted that the reference voltage developed across potentiometer 52 is constant throughout the entire operating range of the clutch. As explained, hereinabove, the resistor 42, inductor 44 and capacitor 46 are so proportioned and arranged that voltage fluctuations appearing across the circuit comprising these elements are virtually ineffective in causing any voltage fluctuations across capacitor 46. Since the frequency of the generator 40 output wave varies directly with the voltage and rotary speed thereof, the impedances of the circuits comprising resistor 42 and inductor 44 on the one hand and capacitor 46 on the other hand have oppositely changing impedances. That is, the impedance of the L-R circuit increases with frequency while the impedance of the capacitor decreases with frequency. Accordingly, the voltage drop across capacitor 46 under increased frequency conditions decreases sufficiently to compensate for the increased generator voltage applied from generator 40 to maintain the voltage across the capacitor 46, constant. With a suitable selection of parameters the speed range may be as broad as 25 to 1 as clearly shown by the curve $V_{52}$ in Fig. 3 of the drawings.

Figure 2:
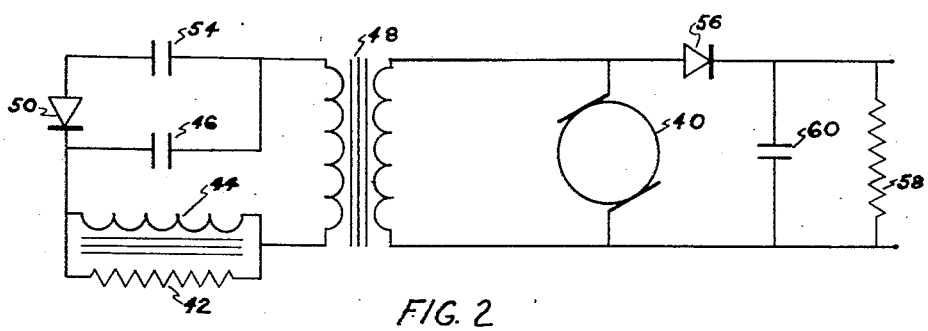
Fig. 2 illustrates a modification of the circuit of Fig. 1.

An an alternative embodiment of the present invention, transformer 48 may be relocated as shown in Fig. 2 wherein the voltage across capacitor 46 may be applied directly to the rectifier and filter circuit of the reference voltage circuit.

It is readily apparent that the present invention presents an important improvement over prior art control circuits in that through a simple, inexpensive, economical, and reliable means the function of a comparatively complicated and costly apparatus is obtained. The reference voltage circuit incorporating the resistor, inductor and capacitor is very effective in maintaining a constant output voltage rendering unnecessary reference voltage circuits including voltage regulators for controlling voltages derived from power lines. It is also readily apparent that the present invention is suitable for wide and varied applications in many fields.

While the present invention has been described with reference to certain specific embodiments thereof, it is readily obvious to those skilled in the art to which it appertains that many changes and modifications may be made therein without deviating from the spirit or scope thereof. It is, accordingly, intended that it be limited only as set forth in the appended claims.

What I claim is:

1. A control circuit apparatus comprising a clutch field coil circuit means including a grid controlled rectifier tube for energizing said field coil, a generator adapted to be driven by a clutch output member and having an output circuit adapted to provide an alternating output voltage, a reference voltage circuit coupled to said generator output circuit, said reference voltage circuit including a pair of frequency responsive circuit elements connected in series, and means for rectifying the voltage across one of said frequency responsive circuit elements, a signal voltage circuit coupled to said generator and providing a direct voltage proportional in magnitude to the rotary speed of said generator, means combining said voltages to produce a control voltage, means applying said control voltage to the grid of said grid controlled rectifier tube whereby the excitation of said clutch field coil is varied inversely as the speed of said generator.

2. A control circuit apparatus comprising a clutch field coil, means for energizing said field coil, means coupled to a clutch output member for electrically indicating the speed thereof, means coupled to said last mentioned means for deriving an electrical reference from said last mentioned means, means coupling said speed indicating means and said reference deriving means to said first mentioned means whereby said field coil is energized in accordance with the speed of said clutch output member.

3. A control circuit apparatus comprising a clutch field coil and a controllable source of direct voltage, means applying said direct voltage across said field coil, an alternating voltage generator adapted to be driven by a clutch output member, a reference voltage circuit comprising an inductor shunted by a resistor connected in series with a capacitor and said generator, means deriving direct voltage proportional in magnitude to the voltage across said capacitor, a signal voltage circuit comprising means deriving a direct voltage proportional in magnitude to the alternating voltage of said generator, means combining said derived direct voltages and means responsive to said combined voltages for controlling the excitation of said clutch coil whereby the speed of said clutch output member is maintained at a constant value.

4. A control circuit apparatus comprising a field coil for a clutch and a source variable direct voltage, means applying said direct voltage across said field coil, an alternating voltage generator adapted to be variably driven by an output member of said clutch, a reference voltage circuit including an inductor, a resistor, and a capacitor, said inductor shunted by said resistor being connected in series with said capacitor and said generator, means rectifying and filtering the voltage across said capacitor, means rectifying and filtering the voltage of said generator, means deriving the algebraic difference between said rectified and filtered voltages, means responsive to said voltage difference for controlling the energization of said clutch coil, whereby the speed of said clutch coil is maintained constant.

5. A clutch control circuit apparatus comprising a field coil for a clutch, means for energizing said clutch field coil, a generator adapted to be driven by the output member of said clutch reference voltage circuit means connected to said generator and producing a direct reference voltage independent of the speed of said generator, signal circuit means connected to said generator and producing a direct signal voltage varying in magnitude directly as the speed of said generator, circuit means responsive to the difference between said voltages for controlling the excitation of said clutch coil inversely with the speed of said generator whereby the speed of said clutch output member is maintained at a constant value.

6. A control circuit apparatus for a clutch field coil comprising circuit means adapted for energizing said coil, a generator, said clutch driving said generator and being speed responsive to the energization of said coil, a reference voltage circuit connected to said generator and comprising a pair of oppositely frequency responsive circuit components, circuit means applying the voltage across one of said frequency responsive circuit components to a rectifier and filter circuit to produce a constant reference voltage, a signal circuit connected to said generator and comprising a rectifier and filter section to produce a signal voltage, circuit means combining said voltages to produce a control voltage equal to the difference between said signal and reference voltages, means applying said control voltage to control said first mentioned means whereby the energization of said coil is controlled to maintain the speed of said generator constant.

7. A control circuit according to claim 6 wherein the output of said reference circuit includes a potentiometer for adjusting the level of said reference voltage to control the speed of said generator.

8. A control circuit apparatus comprising a clutch field coil, means for energizing said field coil, means coupled to a clutch output member for electrically indicating the speed thereof, means coupled to said last mentioned means for deriving an electrical reference comprising an inductor shunted by a resistor connected in series with a capacitor and said last mentioned means, means coupling said speed indicating means and said reference deriving means to said first mentioned means whereby said field coil is energized in accordance with the speed of said clutch output member.

References Cited in the file of this patent
UNITED STATES PATENTS
2,654,832     Jaeschke _____ Nov. 17, 1953